(12) United States Patent
Teng et al.

(10) Patent No.: US 12,265,208 B2
(45) Date of Patent: Apr. 1, 2025

(54) OPTICAL DEVICE

(71) Applicants: Sintai Optical (Shenzhen) Co., Ltd., ShenZhen (CN); Asia Optical Co., Inc., Taichung (TW)

(72) Inventors: Kung-Hsin Teng, Taichung (TW); Yan-Rong Fan, Taichung (TW); Hsien-Chi Lin, Taichung (TW); Zhi-You Dai, Taichung (TW); Chun-Chou Lin, Taichung (TW); Chih-Wen Wang, Taichung (TW); Jia-Zhong Hsu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 403 days.

(21) Appl. No.: 17/739,235

(22) Filed: May 9, 2022

(65) Prior Publication Data
US 2022/0357564 A1 Nov. 10, 2022

(30) Foreign Application Priority Data
May 10, 2021 (CN) .......................... 202110506859.X

(51) Int. Cl.
*G02B 19/00* (2006.01)
*G01S 7/481* (2006.01)
*G01S 17/10* (2020.01)
*G02B 27/30* (2006.01)

(52) U.S. Cl.
CPC ........ *G02B 19/0085* (2013.01); *G01S 7/4813* (2013.01); *G01S 17/10* (2013.01); *G02B 19/0009* (2013.01); *G02B 27/30* (2013.01)

(58) Field of Classification Search
CPC .......... G02B 19/0009; G02B 19/0085; G02B 27/30; G01S 7/4813; G01S 7/4817; G01S 7/4812; G01S 17/42; G01S 17/10
See application file for complete search history.

(56) References Cited

U.S. PATENT DOCUMENTS

| | | | | | |
|---|---|---|---|---|---|
| 4,283,146 | A | * | 8/1981 | Roussel | G01V 8/12 356/397 |
| 6,504,602 | B1 | * | 1/2003 | Hinderling | G01C 1/04 356/5.1 |

(Continued)

FOREIGN PATENT DOCUMENTS

| CN | 109696688 A | 4/2019 |
|---|---|---|
| CN | 111337936 A | 6/2020 |

(Continued)

*Primary Examiner* — Sang H Nguyen
(74) *Attorney, Agent, or Firm* — McClure, Qualey & Rodack, LLP

(57) ABSTRACT

An optical device includes a range finding module. The range finding module includes a first light condenser unit, a light emitting unit and a light receiving unit. The first light condenser unit defines an optical axis and a hole disposed along the optical axis. The first light condenser unit, the light emitting unit and the light receiving unit are sequentially arranged along the optical axis. The light is emitted by the light emitting unit, passes through the hole, reaches an object, is reflected by the object, is converged by the first light condenser unit and is received by the light receiving unit to generate an electrical signal.

18 Claims, 6 Drawing Sheets

(56) References Cited

U.S. PATENT DOCUMENTS

| | | | | |
|---|---|---|---|---|
| 2007/0058230 | A1* | 3/2007 | Blug | G02B 26/105 250/234 |
| 2008/0074637 | A1* | 3/2008 | Kumagai | G01S 7/4817 356/4.01 |
| 2008/0075325 | A1* | 3/2008 | Otani | G01C 15/002 382/106 |
| 2012/0013917 | A1* | 1/2012 | Ohtomo | G01S 17/42 356/603 |
| 2012/0105824 | A1* | 5/2012 | Ohtomo | G01C 15/002 356/5.01 |
| 2012/0249996 | A1* | 10/2012 | Tanaka | G01S 17/42 356/4.01 |
| 2012/0320219 | A1* | 12/2012 | David | G01S 17/89 348/169 |
| 2015/0355331 | A1* | 12/2015 | Kumagai | G01S 17/89 356/5.01 |
| 2019/0242982 | A1* | 8/2019 | Wang | G01S 7/4812 |

FOREIGN PATENT DOCUMENTS

| | | |
|---|---|---|
| CN | 111458857 A | 7/2020 |
| CN | 111856481 A | 10/2020 |
| EP | 2860497 A1 | 4/2015 |
| TW | I744209 B | 10/2021 |

\* cited by examiner

OPTICAL DEVICE

BACKGROUND OF THE INVENTION

Field of the Invention

The invention relates to an optical device, and more particularly to an optical device with the accuracy of distance measurement effectively improved and the range of rotation for measurement capable of 360°.

Description of the Related Art

Generally, the light emitter and the light receiver of a rotary rangefinder are arranged in two ways: coaxially and non-coaxially. In the coaxial arrangement, only a forty-five-degree reflective mirror disposed on the upper portion of the rangefinder is rotated and the other portions are stationary during the distance measurement. However, the range of rotation for measurement cannot reach 360° because the rangefinder is necessarily provided with signal cables for controlling the rotation of the reflective mirror and a passage allowing the signal cables to pass through. In the non-coaxial arrangement, the range of rotation for measurement can reach 360°. However, the rangefinder has a blind zone at the near end thereof (because the light emitter and the light receiver are arranged non-coaxially) so that the measurement of the non-coaxial rangefinder is less accurate than that of the coaxial rangefinder.

BRIEF SUMMARY OF THE INVENTION

The invention therefore provides an optical device to address the above issues. The optical device in accordance with an exemplary embodiment of the invention includes a range finding module. The range finding module includes a first light condenser unit, a light emitting unit and a light receiving unit. The first light condenser unit defines an optical axis and a hole disposed along the optical axis. The first light condenser unit, the light emitting unit and the light receiving unit are sequentially arranged along the optical axis. The light is emitted by the light emitting unit, passes through the hole, reaches an object, is reflected by the object, is converged by the first light condenser unit and is received by the light receiving unit to generate an electrical signal.

In another exemplary embodiment, the optical device further includes a control module wherein the control module commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

In yet another exemplary embodiment, the optical device further includes a driving module and a sleeve. The range finding module is driven by the driving module to rotate so that the first light condenser unit, the light emitting unit and the light receiving unit are synchronously rotated. The sleeve is disposed between the light emitting unit and the light condensing unit. The sleeve is a hollow tubular object that is open to a front and a rear and includes a front end closer to the light condenser unit and a rear end closer to the light emitting unit.

In another exemplary embodiment, the optical device further includes a hood and a sleeve. The first light condenser unit is a plano-convex lens, a biconvex lens, or a concave-convex lens. The hood is disposed between the light condenser unit and the object. The hood includes an inner side surface disposed towards the light condenser unit. The sleeve is a hollow tubular object that is open to a front and a rear, and includes a front end penetrated through the hole and disposed closer to or propped against the inner side surface of the hood.

In yet another exemplary embodiment, the optical device further includes a control module wherein the control module commands the driving module to rotate the range finding module, commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

In another exemplary embodiment, the optical device further includes a second light condenser unit and a collimating unit. The second light condenser unit is disposed along the optical axis and between the light emitting unit and the light receiving unit, for further converging the light to the light receiving unit after the light is converged by the first light condenser unit. The collimating unit is disposed along the optical axis and between the light emitting unit and the first light condenser unit, for collimating the light emitted by the light emitting unit to pass through the hole. The hole has nothing but air inside.

In yet another exemplary embodiment, the optical device further includes a driving module. The range finding module is driven by the driving module to rotate so that the first light condenser unit, the light emitting unit, the second light condenser unit, the collimating unit and the light receiving unit are synchronously rotated. The light emitting unit includes an emitting end from which the light is emitted, and the collimating unit is disposed near the emitting end of the light emitting unit.

In another exemplary embodiment, the range finding module is rotated about a rotational axis, and the rotational axis is perpendicular to the optical axis.

In yet another exemplary embodiment, the second light condenser unit is a plano-convex lens, a biconvex lens, or a concave-convex lens.

In another exemplary embodiment, The optical device satisfies at least one of following condition: $0.05<d1/d2<0.3$ and $0.05<D1/D2<0.3$ where d1 is a diameter of the hole, d2 is a diameter of the first light condenser unit, D1 is a distance between the light emitting unit and the first light condenser unit, and D2 is a distance between a light emitting surface of the first light condenser unit and that of the second light condenser unit.

In yet another exemplary embodiment, the optical device further includes a driving module. The range finding module further includes a reflective unit. The reflective unit is driven by the driving module to rotate about a rotational axis. The optical axis overlaps with the rotational axis. The light, after passing through the hole, is reflected by the reflective unit to the object. The light is reflected by the reflective unit to the first light condenser unit after the light is reflected back to the range finding module by the object.

In another exemplary embodiment, the optical device further includes a driving module. The range finding module is driven by the driving module to rotate. The driving module includes a bearing, outer coils surrounded by the bearing, and inner coils surrounded by the outer coils. A distance between the bearing and the outer coils is at least 2.5 mm.

In yet another exemplary embodiment, the optical device includes a range finding module. The range finding module includes a first light condenser unit, a light emitting unit and a light receiving unit. The first light condenser unit defines an optical axis. The light emitting unit, the first light condenser unit and the light receiving unit are sequentially arranged along the optical axis. Light is emitted by the light emitting unit, reaches an object, is reflected by the object, is converged by the first light condenser unit and is received by the light receiving unit to generate an electrical signal.

In another exemplary embodiment, the range finding module further includes a collimating unit disposed on the optical axis, and the range finding module, the light emitting unit, the first light condenser unit and the light receiving unit are sequentially arranged along the optical axis.

In yet another exemplary embodiment, the range finding module is rotated about a rotational axis, and the rotational axis is perpendicular to the optical axis.

In another exemplary embodiment, the optical device further includes a driving module. The range finding module further includes a reflective unit. The reflective unit is driven by the driving module to rotate about a rotational axis. The optical axis overlaps with the rotational axis. The light, after emitted by the light emitting unit, is reflected by the reflective unit to the object. The light is reflected by the reflective unit to the first light condenser unit after the light is reflected back to the range finding module by the object.

In yet another exemplary embodiment, the optical device further includes a driving module. The range finding module is driven by the driving module to rotate. The driving module includes a bearing, outer coils surrounded by the bearing, and inner coils surrounded by the outer coils. A distance between the bearing and the outer coils is at least 2.5 mm.

In another exemplary embodiment, the optical device further includes a control module. The control module commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light. The first light condenser unit is a plano-convex lens, a biconvex lens, or a concave-convex lens.

In yet another exemplary embodiment, the optical device further includes a driving module and a control module. The range finding module is driven by the driving module to rotate so that the first light condenser unit, the light emitting unit and the light receiving unit are synchronously rotated. The control module commands the driving module to rotate the range finding module, commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

In another exemplary embodiment, the optical device further includes a driving module. The range finding module further includes a collimating unit disposed on the optical axis. The range finding module is driven by the driving module to rotate so that the first light condenser unit, the light emitting unit, the collimating unit and the light receiving unit are synchronously rotated. The light emitting unit includes an emitting end from which the light is emitted, and the collimating unit is disposed near the emitting end of the light emitting unit.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
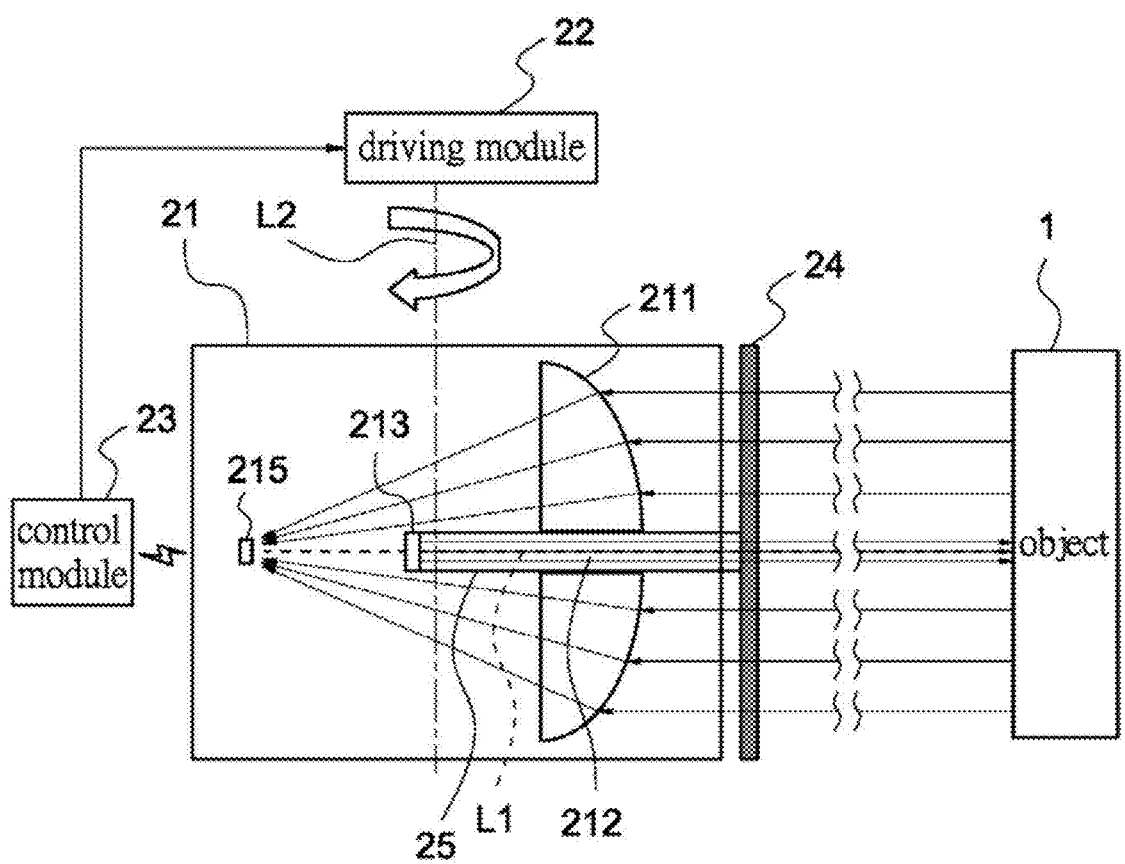
FIG. 1 is a schematic diagram of an optical device in accordance with the first embodiment of the invention.

Referring to FIG. 1, FIG. 1 is a schematic diagram of an optical device in accordance with the first embodiment of the invention. The optical device 2 includes a range finding module 21, a driving module 22 and a control module 23, the structure and operation of which are described in detail in the following:

The range finding module 21 includes a light condenser unit 211, a light emitting unit 213 and a light receiving unit 215. In this embodiment, the light condenser unit 211 is a plano-convex lens. However, the invention is not limited thereto. The light condenser unit 211 may be a biconvex lens, a concave-convex lens, or other converging lenses. The light condenser unit 211 is provided with a hole 212 extending along an optical axis L1 wherein the hole 212 has no elements (for example, plastic or glass) disposed therein. That is, the hole 212 has nothing but air inside. It is worth noting that the light condenser unit 211, the light emitting unit 213 and the light receiving unit 215 are sequentially arranged along the optical axis L1.

When a distance is measured, the control module 23 commands the driving module 22 to drive the range finding module 21 so that the range finding module 21 is rotated, wherein the light condenser unit 211, the light emitting unit 213 and the light receiving unit 215 are synchronously rotated about a rotational axis L2. At the same time, the control module 23 commands the light emitting unit 213 to emit light. The light passes through the hole 212 of the light condenser unit 211, reaches an object 1, is reflected back to the optical device 2 by the object 1, is converged by the light condenser unit 211, and is received by the light receiving unit 215. After receiving the light, the light receiving unit 215 converts it into an electrical signal, and wirelessly transmits the electrical signal to the control module 23. Then, the control module 23 can calculate the distance between the object 1 and the optical device 2 in accordance with the formula: Distance=Light Speed×Time Difference, where the time difference is a difference between the time when the control module 23 commands the light emitting unit 213 to emit the light and the time when the light receiving unit 215 receives the light.

In this embodiment, the rotational axis L2 and the optical axis L1 of the light condenser unit 211 are perpendicular to each other.

Because the light emitting unit 213 and the light receiving unit 215 have the common optical axis, the range finding module 21 has no blind zone even at the near end thereof. Further, the light receiving unit 215 is configured to wirelessly transmit the signal to the control module 23. Therefore, no passage for signal cables is required, and the rotation of the optical device 2 of the invention for measurement of the distance can reach 360°.

In this embodiment, the light emitting unit 213 may be a laser diode (LD) or other light sources. The light receiving unit 215 may be a photoelectric diode (PD), a photomultiplier tube (PMT), a charge coupled device (CCD), an avalanche photodiode (APD), a single-photon avalanche diode (SPAD), or other light sensors.

In this embodiment, the control module 23 may be a micro controller unit (MCU), a digital signal processor (DSP), a center processing unit (CPU), a field programmable gate array (FPGA), a complex programmable logic device (CPLD) or the like.

In this embodiment, the driving module 22 may be a motor, or other power output devices.

The range finding module 21 further includes a hood 24 disposed between the light condenser unit 211 and the object 1. The hood 24 has an inner side surface disposed towards the light condenser unit 211 and an outer side surface disposed towards the object 1. A sleeve 25 may be additionally provided between the light emitting unit 213 and the light condenser unit 211 to avoid the light emitted by the light emitting unit 213 to be reflected by the inner side surface of the hood 24 and to be absorbed by the light receiving unit 215. The sleeve 25 is a hollow tubular object that is open to the front and the rear. The rear end of the sleeve 25 is disposed towards the light emitting unit 213. The sleeve 25 is configured to penetrate through the hole 212, with the front end thereof propped against the inner side surface of the hood 24. By such arrangement, the possibility of light reflection by the inner side surface of the hood 24 can be significantly reduced. Alternatively, the sleeve is modified (not shown in FIG. 1) to have the rear end disposed towards the light emitting unit 213 and the front end disposed towards the light condenser unit 211 so that the light emitted by the light emitting unit 213 can be collimated to pass through the hole 212. By the modified arrangement, the possibility of light reflection by the inner side surface of the hood 24 can be also significantly reduced.

Figure 2:
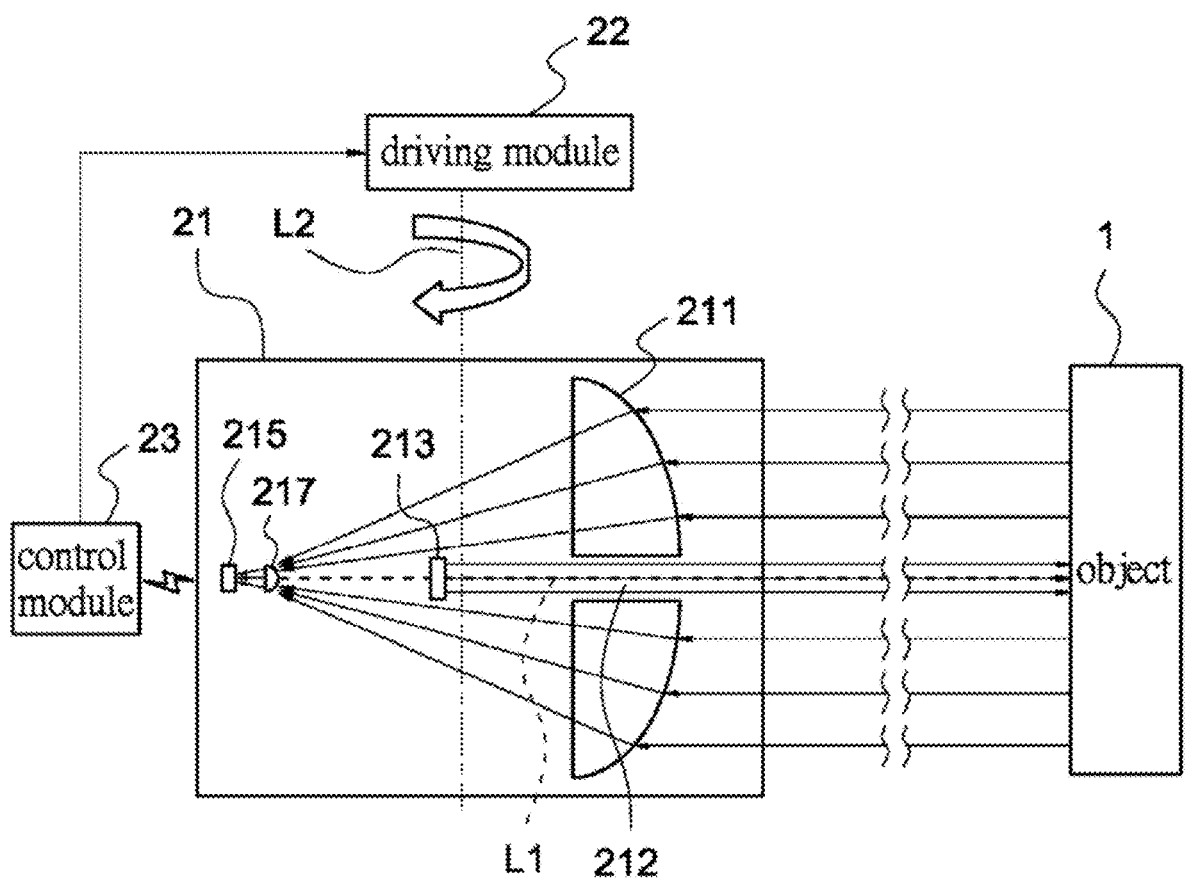
FIG. 2 is a schematic diagram of an optical device in accordance with the second embodiment of the invention.

Referring to FIG. 2, FIG. 2 is a schematic diagram of an optical device in accordance with the second embodiment of the invention. The second embodiment differs the first embodiment in that the range finding module 21 of the second embodiment includes another light condenser unit 217. The light condenser unit 217 is disposed in front of the light receiving unit 215, for further converging the light to the light receiving unit 215 after the light is converged by the light condenser unit 211. Similar to the light condenser unit 211, the light condenser unit 217 may be a plano-convex lens, a biconvex lens, a concave-convex lens, or other converging lenses. The other parts of the second embodiment are the same as those of the first embodiment and therefore the descriptions thereof are omitted. The range finding module 21 may further include a collimating unit (not shown) disposed on the optical axis L1 and between the light emitting unit 213 and the light condenser unit 211 so that the light emitted by the light emitting unit 213 can be collimated to pass through the hole 212, thereby reducing the possibility of divergence of the emitted light, the possibility of entry of the emitted light into the light condenser unit 211, and the possibility of interference between the emitted light and the reflected light. Further, the light is emitted at an emitting end of the light emitting unit 213, and the collimating unit is disposed near the emitting end of the light emitting unit 213. It is worth noting that the light emitting unit 213 and the collimating unit may be packaged and integrated into a single element that ensures the coaxiality of the light emitting unit 213 and the collimating unit. Therefore, only an adjustment of the coaxiality of the single element, the light condenser unit 217 and the light receiving unit 215 is required in the later assembly. That is, for the assembly and adjustment, an embodiment with the light emitting unit and the collimating unit packaged and integrated is superior to that without the light emitting unit and the collimating unit packaged and integrated.

Figure 3:
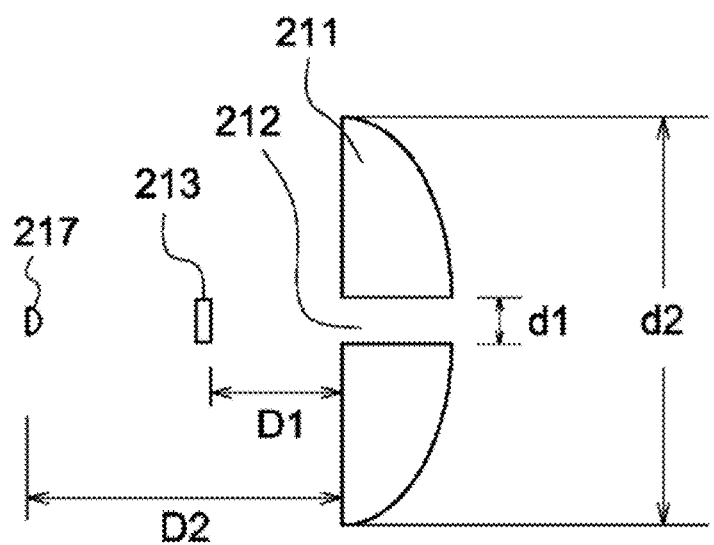
FIG. 3 depicts a distance between the light condenser unit and the light emitting unit of the range finding module of FIG. 2.

Further, the dimensions of the light condenser unit 211 are related to those of the hole 212. If the area of the light condenser unit 211 is not sufficiently large, then both of the received light quantity and the measured distance will be affected. The invention provides a small hole 212 allowing the collimated light to pass through. Therefore, the light condenser unit 211 can have a maximum area to collect the reflected light (to achieve a best light converging effect) and the distance to be measured can be increased. Referring to FIG. 3, to achieve these purposes, the range finding module 21 of the invention satisfies at least one of the following conditions:

$$0.05 < d1/d2 < 0.3 \quad (1)$$

$$0.05 < D1/D2 < 0.3 \quad (2)$$

where d1 is the diameter of the hole 212, d2 is the diameter of the light condenser unit 211, D1 is the distance between the light emitting unit 213 and the light condenser unit 211, and D2 is the distance between the light emitting surface of the light condenser unit 217 and the light emitting surface of the light condenser unit 211.

Referring to Table 1, four examples in Table 1 are able to verify the above conditions (1) and (2) wherein the length unit is millimeter (mm).

TABLE 1

|  | d1(mm) | d2(mm) | D1(mm) | D2(mm) |
|---|---|---|---|---|
| Example 1 | 3 | 45 | 5 | 25.17 |
| Example 2 | 3 | 35 | 5 | 50.76 |
| Example 3 | 4 | 50.8 | 7 | 58.31 |
| Example 4 | 2.5 | 9 | 5 | 37.9 |
| Condition (1): 0.05 < d1/d2 < 0.3 | Example 1 = 0.067 | Example 2 = 0.086 | Example 3 = 0.079 | Example 4 = 0.278 |
| Condition (2): 0.05 < D1/D2 < 0.3 | Example 1 = 0.199 | Example 2 = 0.099 | Example 3 = 0.12 | Example 4 = 0.132 |

Figure 4:
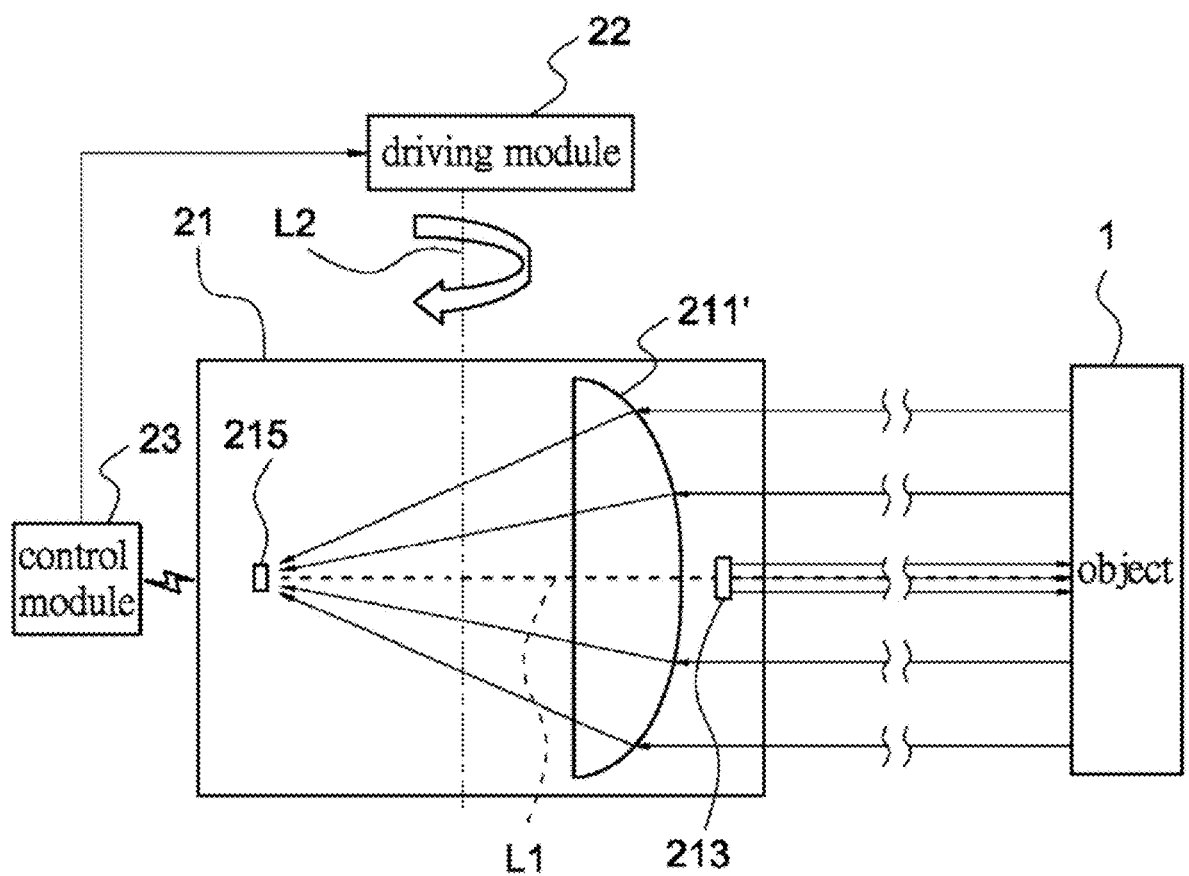
FIG. 4 is a schematic diagram of an optical device in accordance with the third embodiment of the invention.

Referring to FIG. 4, FIG. 4 is a schematic diagram of an optical device in accordance with the third embodiment of the invention. The third embodiment differs the second embodiment in that the light condenser unit 211' of the third embodiment is disposed between the light emitting unit 213 and the light receiving unit 215, has only one light condenser unit 211' and has no hole for light to pass through.

When a distance is measured, light is emitted by the light emitting unit 213, reaches an object 1, is reflected back to the optical device 2 by the object 1, is converged by the light condenser unit 211', and is received by the light receiving unit 215.

Because the light emitting unit 213 is disposed in front of the light condenser unit 211', a hole allowing light to pass through is not required by the light condenser unit 211'. Thus, processing the light condenser unit 211' to form a hole is not required, and the manufacturing cost is reduced. Further, the light condenser unit 211', without the hole, has a completely circular cross section that facilitates alignment of the centers of the lighting receiving unit 215 and the light condenser unit 211' as well as the later alignment with the center of the light emitting unit 213.

The range finding module 21 of the third embodiment can be modified to additionally include a collimating unit (not shown). The collimating unit is disposed on the optical axis L1 and before the light emitting unit 213, and has a completely circular cross section. Since the cross sections of the light condenser unit 211' and the collimating unit are completely circular, the centers of them can be readily identified. The alignment of the centers of the lighting receiving unit 215 and the light condenser unit 211' as well as the later alignment with the centers of the light emitting unit 213 and the collimating unit becomes simple and efficient.

Further, the light emitting unit 213 of the third embodiment is disposed in front of the light condenser unit 211' while the light emitting unit 213 of the first embodiment is disposed after the light condenser unit 211. That is, the light emitting unit 213 of the third embodiment is farther from the light receiving unit 215 than those of the first embodiment and the second embodiment. Therefore, the light emitting unit 213 of the third embodiment blocks less light reflected to the light receiving unit 215 than those of the first embodiment and the second embodiment. The range finding module 21 of the third embodiment has better energy utility efficiency, provides better signal quality, is able to measure a farther distance, and achieves a more accurate measurement.

Figure 5:
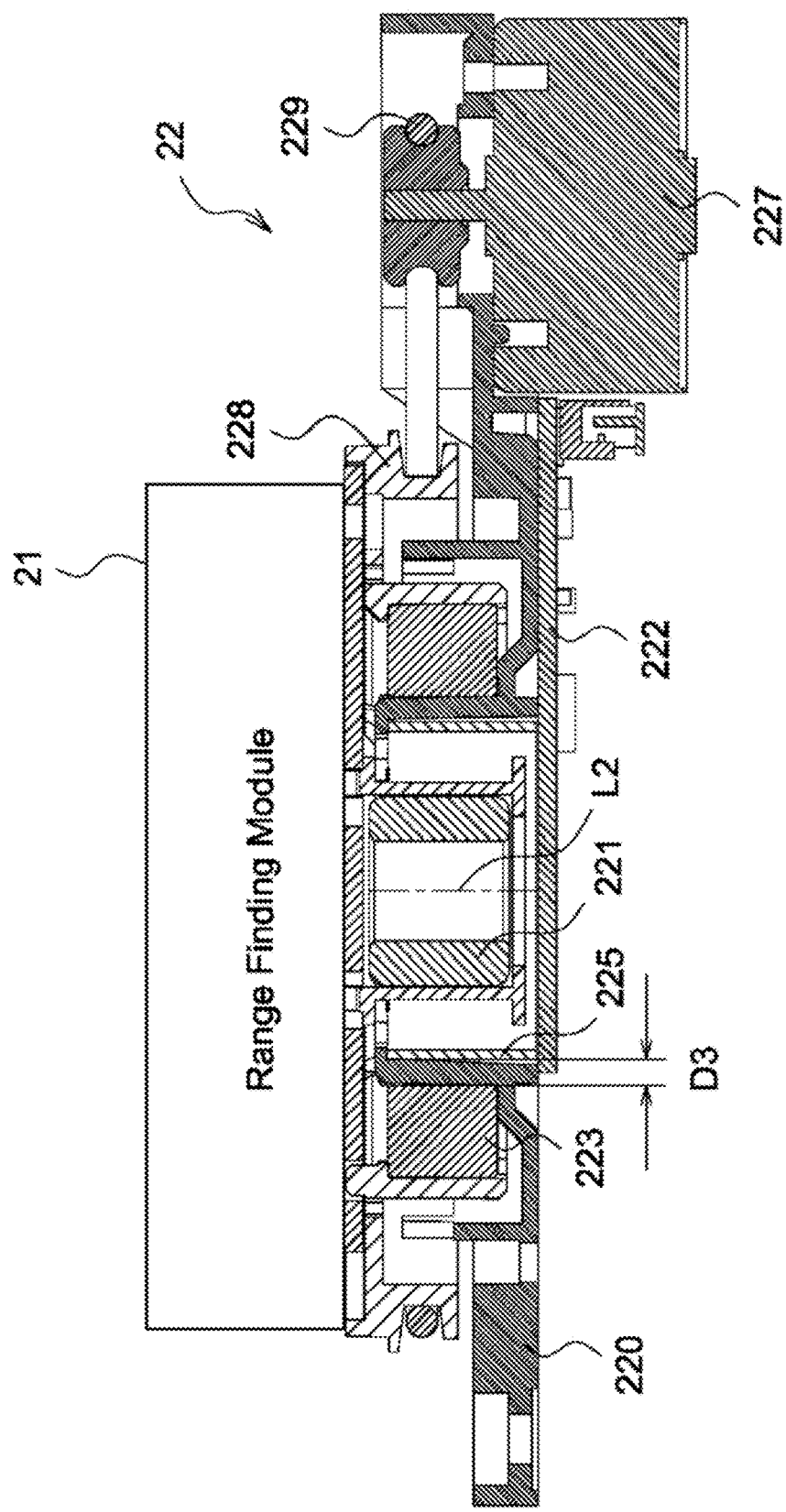
FIG. 5 is a schematic diagram showing the driving module of the optical device of the first, second and third embodiments of the invention.

Referring to FIG. 5, FIG. 5 is a schematic diagram showing the driving module of the optical device of the first, second and third embodiments of the invention. It is noted that the range finding module 21 of the optical device of the first, second and third embodiments is represented by a block. As shown, the driving module 22 includes a base 220 that supports a motor 227, a belt 229, a rotary mount 228, a circuit board 222, a bearing 223, outer coils 225 and inner coils 221. The range finding module 21 is fixed to the rotary mount 228, and the rotary mount 228 is supported by the bearing 223. In operation, the motor 227 drives the rotary mount 228 through the belt 229 to rotate about the rotational axis L2. Thus, the range finding module 21 is rotated about the rotational axis L2 along with the rotary mount 228.

The rotary mount 228 has a chamber to contain the inner coils 221. When the rotary mount 228 is rotated, the inner coils 221 are rotated along with the rotary mount 228. Further, the circuit board 222 supplies power to the outer coils so as to create a magnetic field around the outer coils 225. The outer coils 225 are stationary while the inner coils 221 are rotated. By such arrangement, an electric current is induced and outputted from the inner coils 221 to the light emitting unit 213 and the light receiving unit 215 of the range finding module 21.

As shown in FIG. 5, the inner coils 221 are surrounded by the outer coils 225 and the outer coils 225 are surrounded by the bearing 223. However, the bearing 223 is made of metal. Therefore, the magnetic field created by the outer coils 225 is susceptible to interference of the bearing 223. In this invention, the distance D3 between the bearing 223 and the outer coils 225 is at least 2.5 mm. By such arrangement, the magnetic field lines are blocked less by the bearing 223 that is made of metal, and the energy conversion efficiency between the outer coils 225 and the inner coils 221 can be significantly improved.

In the first, second and third embodiments, the driving module 22 for driving the range finding module 21 to rotate about the rotational axis L2 (the rotational axis L2 is perpendicular to the optical axis L1) is described. However, it is understood that the driving module 22 of FIG. 5 can be applied to any other optical devices in which the range finding module is designed to rotate about a rotational axis perpendicular to the optical axis.

Figure 6:
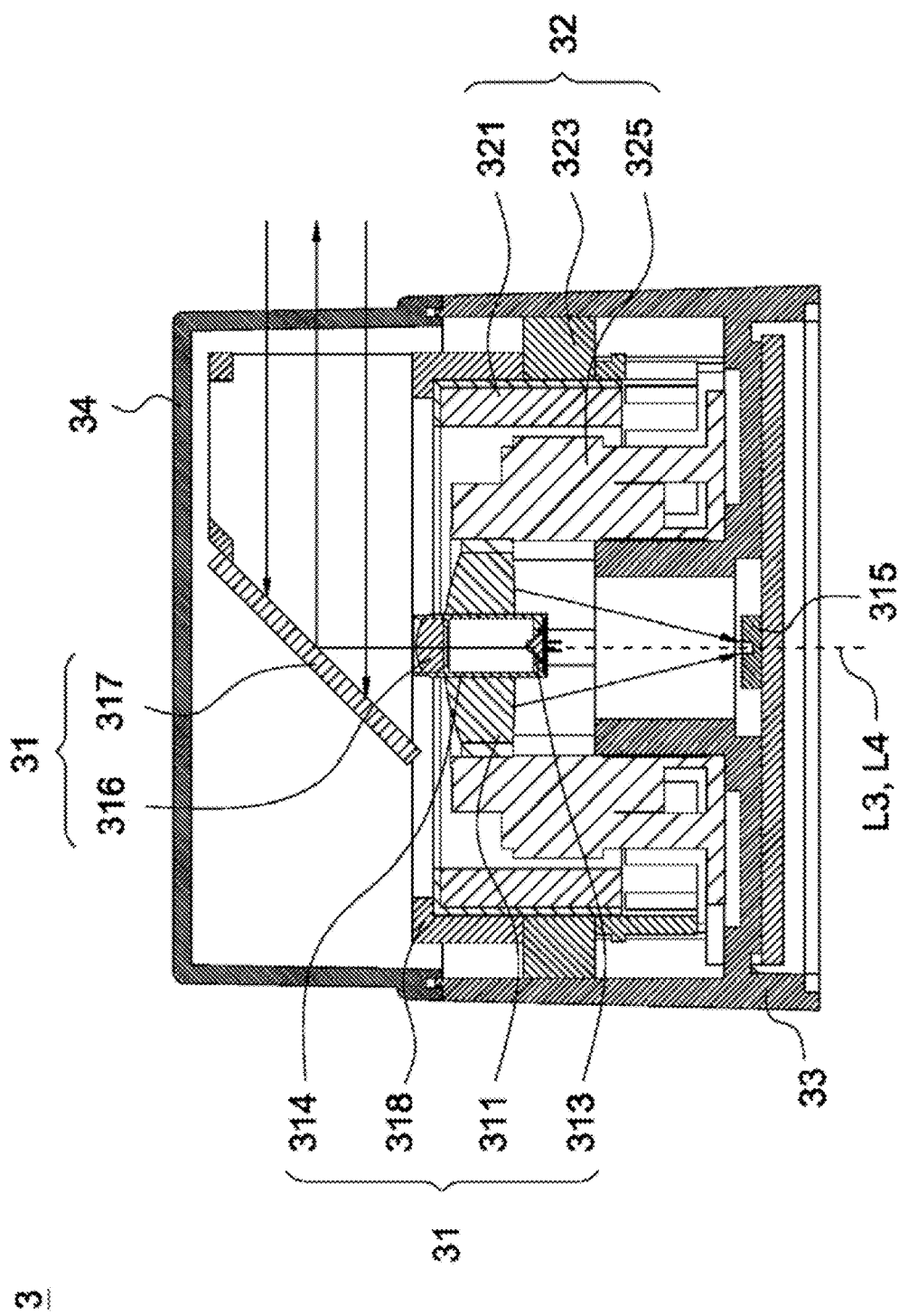
FIG. 6 is a schematic diagram of an optical device in accordance with the fourth embodiment of the invention.

Referring to FIG. 6, FIG. 6 is a schematic diagram of an optical device in accordance with the fourth embodiment of the invention. The optical device 3 includes a range finding module 31, a driving module 32, a base 33 supporting the range finding module 31, and a light permeable hood 34 covering the range finding module 31 and the driving module 32.

The range finding module 31 includes a light condenser unit 311, a light emitting unit 313, a sleeve 314, a light receiving unit 315, a collimating unit 316, a reflective unit 317 and a reflective unit support 318. In this embodiment, the light condenser unit 311 may be a plano-convex lens, a biconvex lens, a concave-convex lens, or other converging lenses. The collimating unit 316 may be a collimating lens. The light emitting unit 313 may be a laser diode (LD) or other light sources. The light receiving unit 315 may be a photoelectric diode (PD), a photomultiplier tube (PMT), a charge coupled device (CCD), an avalanche photodiode (APD), a single-photon avalanche diode (SPAD), or other light sensors. The reflective unit 317 may be a reflective mirror. However, the invention is not limited thereto.

The light condenser unit 311 is perforated with the sleeve 314 fitted therein. The collimating unit 316 is fixed to an end of the sleeve 314 while the light emitting unit 313 is fixed to the other end of the sleeve 314. The reflective unit 317 is angled to be disposed above the collimating unit 316, and is supported by the reflective unit support 318. In FIG. 6, the reflective unit 317 is disposed at an inclined angle of 45°. However, the invention is not limited thereto. It is feasible that the inclined angle of the reflective unit 317 is in a range of 42.75°-47.25°. The collimating unit 316, the light emitting unit 313 and the light receiving unit 315 are arranged along an optical axis L3. In operation, light is emitted by the light emitting unit 313, passes through the collimating unit 316 to be collimated, is reflected by the reflective unit 317, passes through the light permeable hood 34, reaches an object (not shown), is reflected back to the optical device 3 by the object, passes through the light permeable hood 34, is reflected downwards by the reflective unit 317, and is converged to the light receiving unit 315 by the light condenser unit 311.

In this embodiment, the driving module 32 is a brushless outer rotor motor. The driving module 32 includes a stator 325 fixed to the base 33, a rotor 321 surrounding the stator 325, and a bearing 323 fixed to the base 33 for supporting the rotor 321. The reflective unit support 318 is fixed to the rotor 321. The rotor 321 includes magnets, while the stator 325 includes coils. In operation, electric current is provided to pass through the stator 325 and the rotor 321 is rotated by an electromagnetic force. Thus, the reflective unit support 318 and the reflective unit 317 are driven by the rotor 321 to rotate about a rotational axis L4. By such arrangement, the range of rotation for measurement can reach 360°. The range finding module 31 is capable of emitting the light in all directions and receiving the return light from all directions.

As described, the collimating unit 316, the light emitting unit 313 and the light receiving unit 315 are arranged along an optical axis L3. The reflective unit 317 is rotated about a rotational axis L4. It is worth noting that the optical axis L3 overlaps with the rotational axis L4.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical device, comprising:
a range finding module comprising:
a first light condenser unit defining an optical axis and a hole disposed along the optical axis;
a light emitting unit; and
a light receiving unit;
wherein the first light condenser unit, the light emitting unit and the light receiving unit are sequentially arranged along the optical axis;
wherein light is emitted by the light emitting unit, passes through the hole, reaches an object, is reflected by the object, is converged by the first light condenser unit and is received by the light receiving unit to generate an electrical signal;
wherein the optical device satisfies at least one of following condition:

$0.05 < d1/d2 < 0.3$, $0.05 < D1/D2 < 0.3$, where d1 is a diameter of the hole, d2 is a diameter of the first light condenser unit, D1 is a distance between the light emitting unit and the first light condenser unit, and D2 is a distance between a light emitting surface of the first light condenser unit and that of the second light condenser unit.

2. The optical device as claimed in claim 1, further comprising a control module wherein the control module commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

3. The optical device as claimed in claim 1, further comprising a driving module and a sleeve, wherein:
the range finding module is driven by the driving module to rotate so that the first light condenser unit, the light emitting unit and the light receiving unit are synchronously rotated;
the sleeve is disposed between the light emitting unit and the light condensing unit;
the sleeve is a hollow tubular object that is open to a front and a rear and comprises a front end closer to the light condenser unit and a rear end closer to the light emitting unit.

4. The optical device as claimed in claim 3, further comprising a control module wherein the control module commands the driving module to rotate the range finding module, commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

5. The optical device as claimed in claim 1, further comprising a hood and a sleeve, wherein:
the first light condenser unit is a plano-convex lens, a biconvex lens, or a concave-convex lens;
the hood is disposed between the light condenser unit and the object;
the hood comprises an inner side surface disposed towards the light condenser unit;
the sleeve is a hollow tubular object that is open to a front and a rear, and comprises a front end penetrated through the hole and disposed closer to or propped against the inner side surface of the hood.

6. The optical device as claimed in claim 1, further comprising a second light condenser unit and a collimating unit, wherein:
the second light condenser unit is disposed along the optical axis and between the light emitting unit and the light receiving unit, for further converging the light to the light receiving unit after the light is converged by the first light condenser unit;
the collimating unit is disposed along the optical axis and between the light emitting unit and the first light condenser unit, for collimating the light emitted by the light emitting unit to pass through the hole;
the hole has nothing but air inside.

7. The optical device as claimed in claim 6, further comprising a driving module, wherein:
the range finding module is driven by the driving module to rotate so that the first light condenser unit, the light emitting unit, the second light condenser unit, the collimating unit and the light receiving unit are synchronously rotated;
the light emitting unit comprises an emitting end from which the light is emitted, and the collimating unit is disposed near the emitting end of the light emitting unit.

8. The optical device as claimed in claim 6, wherein the second light condenser unit is a plano-convex lens, a biconvex lens, or a concave-convex lens.

9. The optical device as claimed in claim 1, wherein the range finding module is rotated about a rotational axis, and the rotational axis is perpendicular to the optical axis.

10. The optical device as claimed in claim 9, further comprising a driving module, wherein:
the range finding module is driven by the driving module to rotate;
the driving module comprises a bearing, outer coils surrounded by the bearing, and inner coils surrounded by the outer coils;
a distance between the bearing and the outer coils is at least 2.5 mm.

11. The optical device as claimed in claim 1, further comprising a driving module, wherein:
the range finding module further comprises a reflective unit;
the reflective unit is driven by the driving module to rotate about a rotational axis;
the optical axis overlaps with the rotational axis;
the light, after passing through the hole, is reflected by the reflective unit to the object;

the light is reflected by the reflective unit to the first light condenser unit after the light is reflected back to the range finding module by the object.

12. An optical device, comprising:
a range finding module comprising:
a first light condenser unit defining an optical axis;
a light emitting unit; and
a light receiving unit; and
a driving module;
wherein the light emitting unit, the first light condenser unit and the light receiving unit are sequentially arranged along the optical axis;
wherein light is emitted by the light emitting unit, reaches an object, is reflected by the object, is converged by the first light condenser unit and is received by the light receiving unit to generate an electrical signal;
wherein the range finding module is driven by the driving module to rotate;
wherein the driving module comprises a bearing, outer coils surrounded by the bearing, and inner coils surrounded by the outer coils;
wherein a distance between the bearing and the outer coils is at least 2.5 mm.

13. The optical device as claimed in claim 12, wherein the range finding module further comprises a collimating unit disposed on the optical axis, and the range finding module, the light emitting unit, the first light condenser unit and the light receiving unit are sequentially arranged along the optical axis.

14. The optical device as claimed in claim 12, wherein the range finding module is rotated about a rotational axis, and the rotational axis is perpendicular to the optical axis.

15. The optical device as claimed in claim 12, wherein:
the range finding module further comprises a reflective unit;
the reflective unit is driven by the driving module to rotate about a rotational axis;
the optical axis overlaps with the rotational axis;
the light, after emitted by the light emitting unit, is reflected by the reflective unit to the object;
the light is reflected by the reflective unit to the first light condenser unit after the light is reflected back to the range finding module by the object.

16. The optical device as claimed in claim 12, further comprising a control module, wherein:
the control module commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light;
the first light condenser unit is a plano-convex lens, a biconvex lens, or a concave-convex lens.

17. The optical device as claimed in claim 12, further comprising a control module, wherein:
the range finding module is driven by the driving module to rotate so that the first light condenser unit, the light emitting unit and the light receiving unit are synchronously rotated;
the control module commands the driving module to rotate the range finding module, commands the light emitting unit to emit the light, receives the electrical signal from the light receiving unit, and calculates the distance between the object and the optical device by using a time difference, where the time difference is a difference between the time when the control module commands the light emitting unit to emit the light and the time when the light receiving unit receives the light.

18. The optical device as claimed in claim 12, wherein:
the range finding module further comprises a collimating unit disposed on the optical axis;
the range finding module is driven by the driving module to rotate so that the first light condenser unit, the light emitting unit, the collimating unit and the light receiving unit are synchronously rotated;
the light emitting unit comprises an emitting end from which the light is emitted, and the collimating unit is disposed near the emitting end of the light emitting unit.

* * * * *